(12) United States Patent
Thomas

(10) Patent No.: US 6,805,212 B2
(45) Date of Patent: Oct. 19, 2004

(54) PARK PAWL FOR ELECTRIC VEHICLE TRANSMISSIONS

(75) Inventor: James A. Thomas, Spencerville, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 95 days.

(21) Appl. No.: 10/245,093

(22) Filed: Sep. 17, 2002

(65) Prior Publication Data

US 2004/0050600 A1 Mar. 18, 2004

(51) Int. Cl.[7] ............................................... B60K 1/00
(52) U.S. Cl. .................................. 180/65.4; 192/219.4
(58) Field of Search .................. 192/219, 4; 180/65.2, 180/65.3, 65.4, 65.6

(56) References Cited

U.S. PATENT DOCUMENTS

| | | | | | |
|---|---|---|---|---|---|
| 1,710,345 | A | * | 4/1929 | Church | 180/57 |
| 5,038,633 | A | * | 8/1991 | Igarashi et al. | 74/664 |
| 5,323,868 | A | * | 6/1994 | Kawashima | 180/65.4 |
| 5,696,679 | A | * | 12/1997 | Marshall et al. | 701/53 |
| 5,823,281 | A | * | 10/1998 | Yamaguchi et al. | 180/65.2 |
| 6,022,048 | A | * | 2/2000 | Harshbarger et al. | 280/781 |
| 6,044,724 | A | * | 4/2000 | Timms | 74/411.5 |
| 6,116,363 | A | * | 9/2000 | Frank | 180/65.2 |
| 6,125,983 | A | * | 10/2000 | Reed et al. | 192/219.5 |
| 6,186,253 | B1 | | 2/2001 | Barnhart et al. | |
| 6,369,531 | B1 | * | 4/2002 | Oshima et al. | 318/139 |
| 6,589,134 | B2 | * | 7/2003 | Williams et al. | 477/99 |
| 2002/0040839 | A1 | * | 4/2002 | Thyselius | 192/219.5 |

* cited by examiner

Primary Examiner—Bryan Fischmann
(74) Attorney, Agent, or Firm—Jeffrey P. Calfa; Dennis Kelly Sullivan; Susan L. Lukasik

(57) ABSTRACT

A parking pawl is implemented on a series type, hybrid electric vehicle using a pair of parallel worm gear rollers. The worm gear rollers are placed on opposite sides of a transmission gear from one another and mounted for rotation along their major axes allowing the worm gear rollers to be rotated to present either a planed side or a threaded section to the gear. The gear is circumferentially slotted to cooperate with the threaded section of the rollers to prevent rotation of the gear, but to turn freely when the planed faces of the worm gear roller are adjacent the gear.

9 Claims, 3 Drawing Sheets

PARK PAWL FOR ELECTRIC VEHICLE TRANSMISSIONS

FIELD OF THE INVENTION

The present invention relates to a hybrid electric vehicle and more particularly to a park pawl for the transmission of such a vehicle.

BACKGROUND OF THE INVENTION

Series type hybrid electric vehicles have an electric generator driven by a thermal engine to supply electrical power to the vehicles' battery and electrical power distribution systems, which in turn support operation of an electric drive motor. Unlike parallel type electric vehicles which have a drive line which can be driven directly by the thermal engine, series type electric vehicles are driven by only the electric drive motor. The term series refers to the path of energy from the thermal engines to the drive line and hence to a powered axle and wheels. Several advantages follow from this arrangement. For example, if the drive motor does not require power and the thermal engine is running, then all electrical power can be used to charge the battery, and run other electrical power using systems. Further, the drive motor and thermal engine may be positioned on the vehicle chassis without consideration of other's position.

In a series type hybrid electric vehicle, the drive motor may be connected to the driven axle through a gear reduction transmission and a drive train. The transmission is typically based on a ring or planetary gear set comprising several rotatable elements. Park brakes have been provided in such vehicles through a mechanical, non-fluid operated mechanism in proximity to the a portion, or portions, of the drive train, such as illustrated in U.S. Pat. No. 6,186,253. However, park pawls, such as commonly found in automatic transmissions, which provide a back up to park brakes, are not readily duplicated with off the shelf motors and with the gear reduction devices used as transmissions. Nor is the possibility of leaving the vehicle in gear to use the thermal engine as a brake available. What is needed is a mechanically reliable park pawl easily implemented with electric vehicles.

SUMMARY OF THE INVENTION

According to the invention there is provided a park pawl for a transmission for an electric motor. The transmission comprises gears which may be engaged with the drive motor, to propel a vehicle. The park pawl engages a gear to prevent its rotation relative to the frame of the vehicle. The gear is circular with pawl engagement points around its circumference. The pawl proper comprises a pair of worm gear rollers arrayed on opposite sides of the gear from one another and oriented to have parallel axes of rotation in the plane of the gear and perpendicular to the axis of rotation of the gear. The worm gear rollers have planed faces parallel to their respective axes of rotation with the worm gear rollers being positionable to present the planed faces to the gear and thereby allowing the gear to rotate. The worm gear rollers are further positionable to bring their respective gear threads into engagement with the pawl engagement points of the gear by rotation of the rollers, preventing rotation of the gear.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
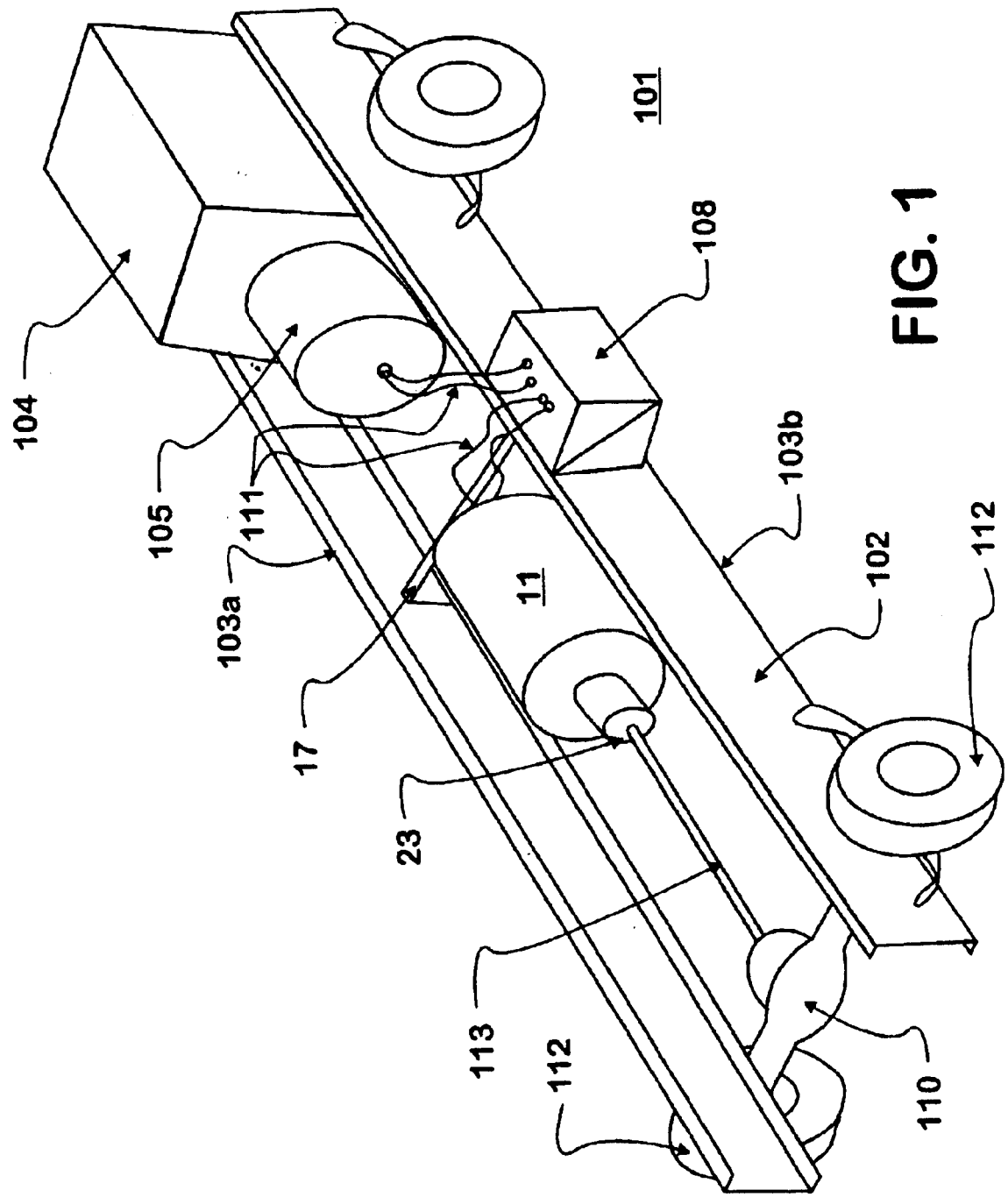
FIG. 1 is a rear quarter perspective view of a chassis of a series type hybrid electric vehicle.
Figure 2:
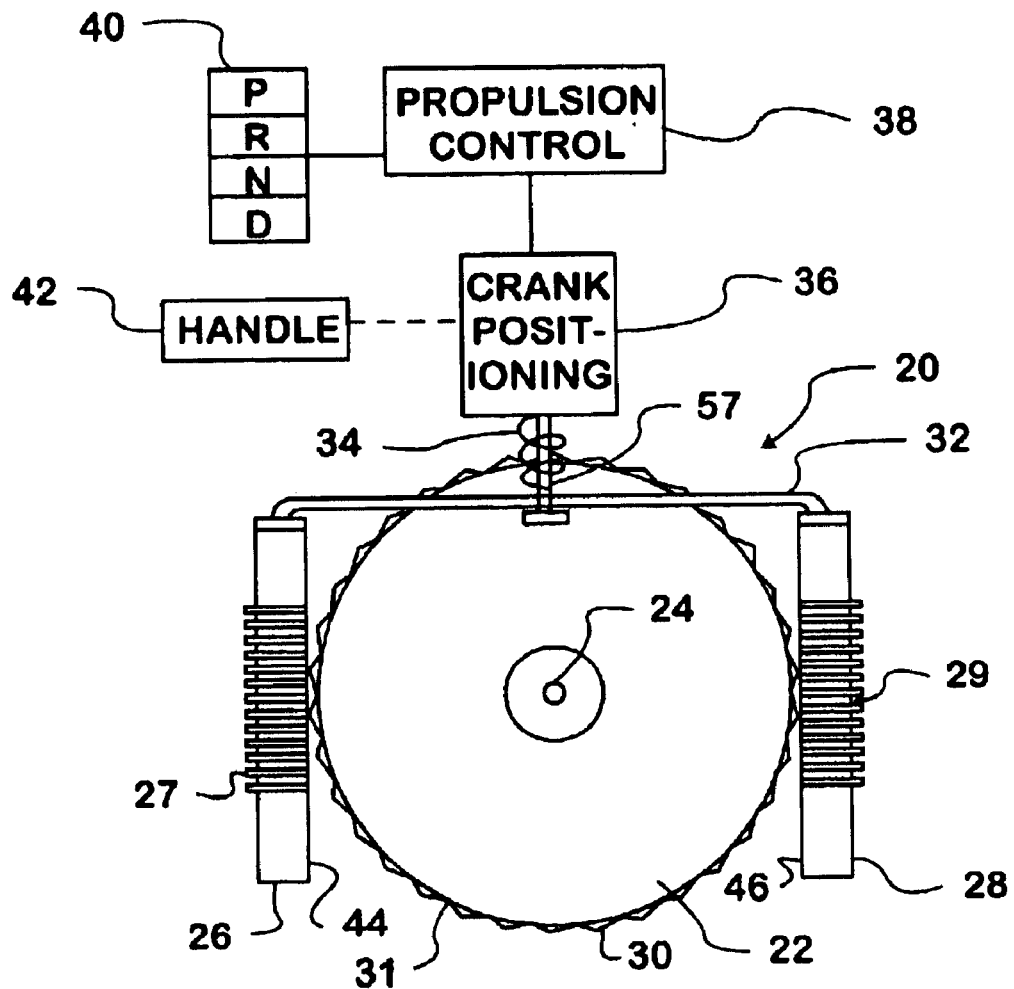
FIG. 2 is a front elevation of a traction motor transmission illustrating the park pawl in a disengaged state.

Referring now to the drawings in greater detail. In FIGS. 1 to 5, there is shown a series type hybrid electric vehicle 101 with an electric drive motor 11 and transmission 23. Vehicle 101 has a chassis 102 with two frame rails 103a and 103b. There is a thermal engine 104, preferably a diesel, and an electric generator 105 supported from frame rails 103a and 103b and positioned relatively forward on the vehicle 101. The generator 105 is driven by thermal engine 104 and is electrically engaged by cables 111 to an electric control system (not shown) and batteries (not shown). The batteries are located within a battery box 108 which hangs from right frame rail 103b. The electric control system and batteries are electrically engaged by cables 111 to electric drive motor 11. The electric drive motor 11 is also supported from frame rails 103a and 103b in part from a chassis cross member 17 and other similar components (not shown).

Electric drive motor 11 is mechanically engaged to drive a drive or rear axle assembly 110 with rear wheels 112 through transmission 23 and a prop or drive shaft 113. Although described and shown as rear drive, the invention may also be applied in a front drive configuration where a drive axle assembly is positioned forward on vehicle 101. Indeed, the invention may be applied to non-vehicle applications where it is desirable to provide a means to positionally lock a drive line. In a vehicle application, when motor 11 is energized and rotates, drive shaft 113 rotates and this rotational motion is coupled to rear wheels 112 through transmission 23 and rear axle assembly 110. Transmission 23 steps down the output of motor 11 to provide the mechanical advantage required for propelling vehicle 101. As described below, transmission 23 also provides a lock feature operating as a highly secure, and reliable, park pawl.

Figure 4:
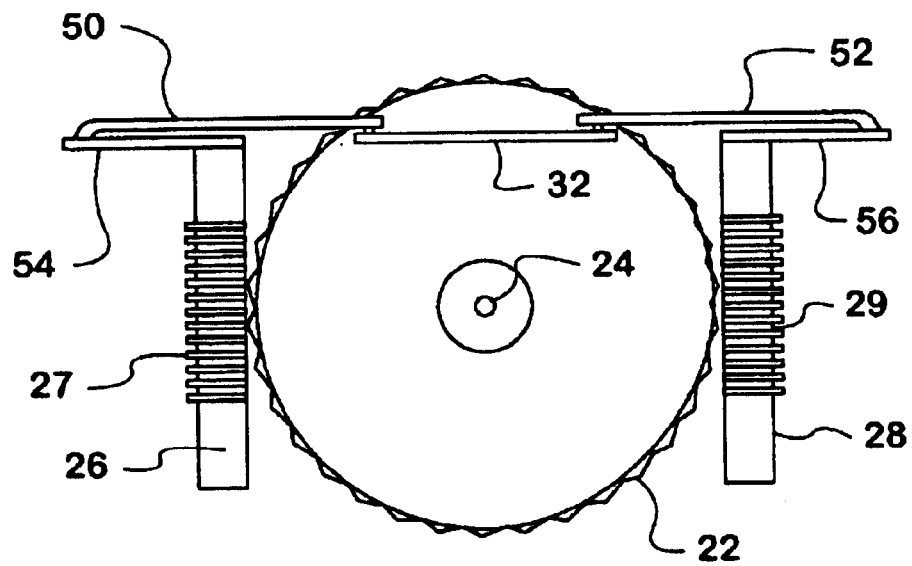
FIG. 4 is a front elevation of the transmission and park pawl showing the park pawl moved to an engaged position.
Figure 5:
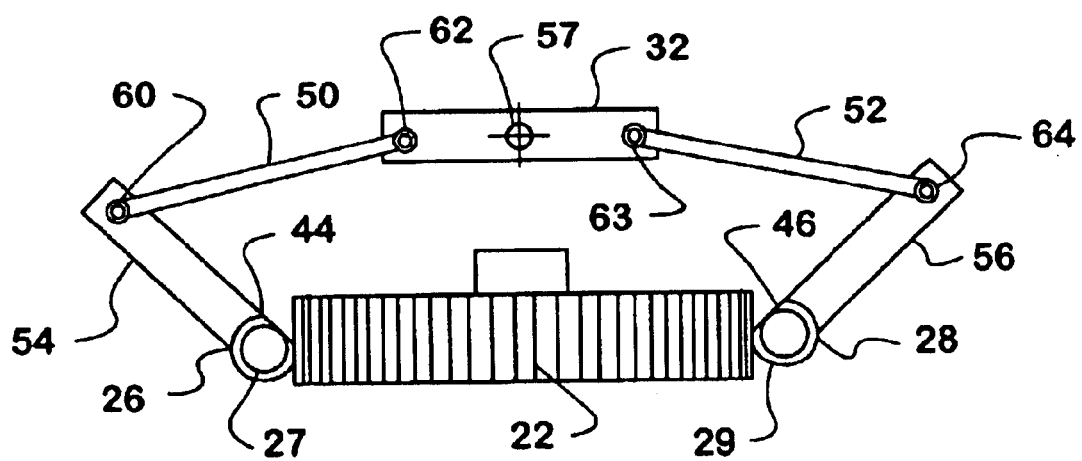
FIG. 5 is a top view of the transmission and park pawl showing the park pawl moved to an engaged position.

The park pawl 20 of the preferred embodiment is implemented by modifying a ring gear 22 by milling (or casting) the gear's circumferential edge into a plurality of teeth 30, with the gaps 31 between the teeth providing a plurality of pawl engagement points. The pawls are provided by the threads 27 and 29 of two worm gear rollers 26 and 28 (or similar structures), which are disposed on opposite sides from one another with respect to gear 22. Worm gear rollers 26 and 28 are milled to provide flat faces 44 and 46, which may be positioned adjacent gear 22 and facing one another upon rotation of the rollers. In this position of rollers 26 and 28, gear 22 is free to rotate on its output shaft 24. Approximately three quarters of the circumference of rollers 26 and 28 is circumscribed by exterior threads 27 and 29, and it is these partial threads which provide the pawl structures for insertion into the gaps 31 between teeth 30 on the gear's circumference when the worm gear rollers are rotated as illustrated in FIGS. 4 and 5.

Figure 3:
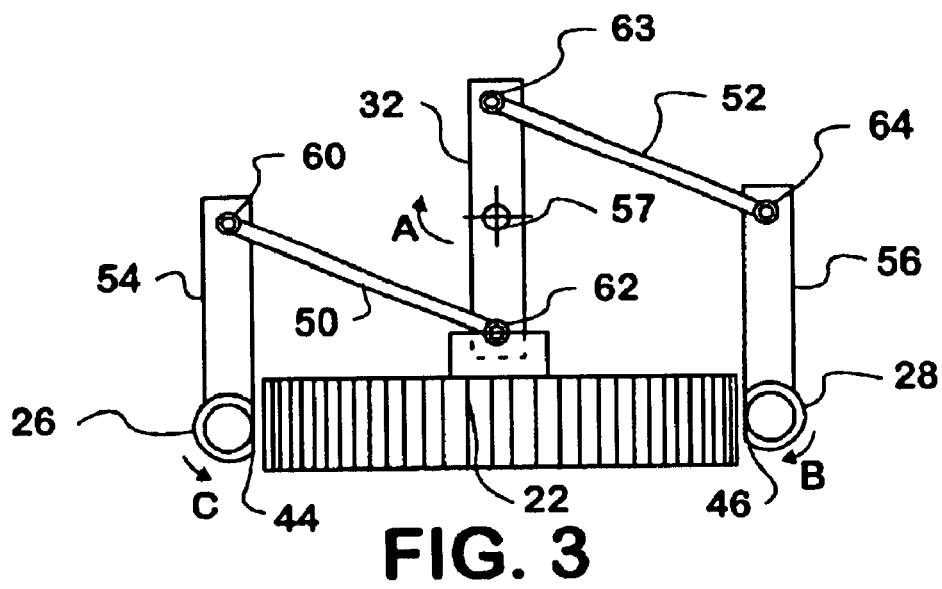
FIG. 3 is a top view of the traction motor transmission of FIG. 2.

In the preferred embodiment, the rotation of worm gear rollers 26 and 28 is coordinated, with worm gear roller 26 rotating counterclockwise as viewed from the top and indicated by the letter C in FIG. 3 and worm gear roller 28 rotating clockwise as indicated by the letter B to engage with gear 22. Worm gear rollers 26 and 28 are interconnected to one another in part through a crank arm 32 which rotates on a central shaft 57. Shaft 57 has an axis of rotation parallel to the axes of rotation of rollers 26 and 28 and is displaced to one side of one of the major surfaces of gear 22. Crank arm 32 is coupled to rollers 26 and 28 by push rods 50 and 52, each of which are attached at one end thereof by pivoting mounts 62 and 63 to opposite ends of the crank arm. The opposite, free ends of push rods 50 and 52 are attached at pivot points 60 and 64 to the ends of levers 54 and 56. Levers 54 and 56 extend to one side of worm gear rollers 26 and 28 away from and perpendicular to the axes of rotation of the worm gear rollers 26 and 28.

With rotation of crank arm 32 in the clockwise direction indicated by the letter A in FIG. 3, push rods 50 and 52 push levers 54 and 56 outwardly turning worm gear rollers 26 and 28 in opposite directions to bring the threaded portion of the rollers into engagement with gear 22. Reversing the direction of rotation of crank arm 32 pulls levers 54 and 56 back to parallel positions and returns the flat or milled faces 44 and 46 to positions facing the edge of gear 22. A spring 34 biases park pawl 20 toward the position illustrated in FIG. 5, so that should the threads 27 and 29 initially impact against teeth 30 instead of sliding into the slots or gaps 31 between the teeth, the threads will be urged into the gaps by the spring force upon any further rotation of gear 22.

Spring 34 may be incorporated into park pawl 20 in a number of ways. As illustrated, spring 34 is shown coupled between crank arm 57 and a fixed point and urges the crank arm to turn in the direction indicated by the letter A. Alternatively, a compression spring could be connected between crank arm 32 and push rods 50 and 52 to bias the rods to a more open position. Still other combinations will occur to those skilled in the art.

Activation of the park pawl 20 is under a vehicle operator's control, which may be done either through a gear shift lever 40 or by a handle 42 installed in a vehicle cab. Where a handle is used crank arm positioning 36 is a direct mechanical linkage for rotating shaft 57. An indent position for handle 42 may be provided for countering the spring bias of spring 34 when it is desired to operate the vehicle. Alternatively, propulsion control 38 may be used to operate a crank positioning motor 36 when a gear shift selector is moved from park to drive, neutral or reverse.

The park pawl of the present invention provides secure locking of a transmission, even under shock loading. Positioning of the pawl can be effected using a simple combination of a spring and mechanical linkage. The cost is low and the modification required of the off the shelf components minimal.

While the invention is shown in only one of its forms, it is not thus limited but is susceptible to various changes and modifications without departing from the spirit and scope of the invention.

What is claimed is:

1. A hybrid electric vehicle, comprising:
   a chassis with two parallel side frame rails;
   an engine mounted on the chassis;
   an electric generator mounted to the chassis and coupled to be driven by the engine;
   an electrical power system connected to receive power from the electric generator;
   a drive motor mounted on the chassis and coupled to the electrical power system to receive energization therefrom;
   wheels depending from the chassis for supporting the vehicle on a surface;
   a transmission including a gear coupled to the drive motor, the gear having an axis of rotation and having an outer edge carrying a plurality of outwardly oriented engagement points;
   a drive train coupling the transmission to a pair of the wheels;
   a rotary locking mechanism located proximate to the gear, the rotary locking mechanism comprising first and second parallel rollers positioned opposite one another across the gear, the first and second rollers having axes of rotation perpendicular to the axis of rotation for the gear and the first and second roller having blades for engaging the engagement points extending from the first and second rollers, the first and second parallel rollers having a first rotational position in which the blades are free of the gear and a second rotation positional wherein the blades engage the plurality of outwardly oriented engagement points to prevent rotation of the gear; and
   means for actuating the rotary looking mechanism.

2. A hybrid electric vehicle as set forth in claim 1, the means for actuating comprising:
   a crank arm mounted on a pivot between the first and second rollers;
   first and second levers, one extending from each of the first and second rollers perpendicular to the axis of rotation for the respective roller; and
   first and second linkages connected between the crank arm and the first and second levers, respectfully.

3. A hybrid electric vehicle as set forth in claim 2, further comprising:
   means for positioning the crank arm.

4. A transmission and locking pawl for an electric motor, comprising:
   a gear coupled to the drive motor having an axis of rotation and the gear having an outer edge with a plurality of engagement points located on the outer edge;
   first and second rotatable worm gear rollers positioned opposite one another across the gear, the first and second rotatable worm gear rollers having axes of rotation in a common plane perpendicular to the axis of rotation of the gear for rotating into and out of engagement with the engagement points of the gear; and
   means for synchronously rotating the first and second rotatable worm gear rollers.

5. A transmission and locking pawl for an electric motor as set forth in claim 4, the first and second rotatable worm gear rollers each further comprising:
   a roller set to rotate on the axis of rotation; and
   a plurality of blades extending outwardly from the roller for engaging the engagement points in certain rotational positions of the roller.

6. A transmission and locking pawl for an electric motor as set forth in claim 5, further comprising:
   a crank arm mounted on a pivot between the rollers;
   first and second levers, one extending from each roller perpendicular to the axis of rotation for the respective roller; and first and second linkages connected between the crank arm and the first and second levers, respectfully.

7. A transmission and locking pawl for an electric motor as set forth in claim 6, further comprising:

means for positioning the crank arm.

8. A transmission and locking pawl for an electric motor as set forth in claim 7, wherein the transmission and locking mechanism is installed on an vehicle.

9. A parking pawl for a series type electric vehicle, comprising:

a transmission having at least a first power transfer gear mounted with an axis of rotation;

a plurality of indentations in the perimeter of the first power transfer gear;

first and second rollers mounted parallel to one another proximate to opposed sides of the first power transfer gear, the first and second rollers carrying ribbing partially encircling the rollers perpendicular to their respective axes of rotation, the ribbing being moveable into and out the indentations in the perimeter of the first power transfer gear;

first and second end mounted levers extending from the first and second rollers, respectively, perpendicular to the axes of rotation for rotating the rollers;

a crank arm disposed on a pivot point between the first and second end mounted levers;

first and second linkages between the crank arm and the first and second end mounted levers for moving the end mounted levers with rotation of the crank arm; and means for positioning the crank arm.

* * * * *